United States Patent
Larsson et al.

[11] Patent Number: 5,111,768
[45] Date of Patent: May 12, 1992

[54] FREEZE INDICATOR

[75] Inventors: Raymond P. Larsson, Denville; George T. Levendusky, Bayonne, both of N.J.

[73] Assignee: Pymah Corporation, Somerville, N.J.

[21] Appl. No.: 712,335

[22] Filed: Jun. 7, 1991

[51] Int. Cl.$^5$ .................. G01K 5/32; G01N 31/00
[52] U.S. Cl. .................. 116/216; 252/408.1; 252/70; 374/162; 116/219; 116/201
[58] Field of Search .............. 252/408.1, 962, 70; 116/219, 216, 201, 207; 374/162

[56] References Cited
U.S. PATENT DOCUMENTS

| | | | |
|---|---|---|---|
| 3,701,282 | 10/1972 | Peterson | 73/358 |
| 3,996,007 | 12/1976 | Fang et al. | 23/253 TP |
| 4,132,186 | 1/1979 | Manske et al. | 116/216 |
| 4,145,918 | 3/1979 | Couch et al. | 116/216 |
| 4,191,125 | 3/1980 | Johnson | 116/219 |
| 4,457,252 | 7/1984 | Marske | 116/216 |
| 4,457,253 | 7/1984 | Manske | 116/216 |
| 4,846,095 | 7/1989 | Emslander | 116/206 |

Primary Examiner—Richard D. Lovering
Assistant Examiner—N. Bhat

[57] ABSTRACT

A method is disclosed for substantially eliminating undercooling in a liquid cooled below its freezing point which comprises utilizing a nucleating agent system comprising:

(1) a nucleating agent which is a metal compound, insoluble in the liquid, the metal compound and liquid having similar molecular space groupings; and (2) at least 0.075 wt. % based on the metal compound of a soluble salt of a metal which is the same metal as that of the metal compound.

In a preferred embodiment the valence state of the metal of the salt is the same as that of the metal of the metal compound. In another embodiment a metal compound of limited solubility, e.g., less than 1% by weight in the liquid, more preferably about 0.15 to about 0.25 wt. %, is utilized to serve the function of both the insoluble nucleating agent and the soluble metal salt.

Where the liquid is water, deuterium oxide or mixtures thereof the preferred metal compound is cupric sulfide and the preferred salt is cupric sulfate.

36 Claims, 2 Drawing Sheets

FREEZE INDICATOR

BACKGROUND OF THE INVENTION

This invention relates to freeze indicators. More particularly, it relates to freeze indicators which may be adjusted to provide precise information to the user that a product has been exposed to a certain low temperature, usually near the freezing point of water.

Freeze indicators which utilize the expansion characteristic of water to break a frangible ampule are well known in the art; see for example, Smith U.S. Pat No. 3,545,400. Once for device shown in the Smith '400 patent is exposed to temperatures below the freezing point of water, the water freezes into ice and expands causing the ampule to break. After the ice was formed and after the surrounding temperature returned to a point above the melt point of the ice, the water was absorbed on a dye loaded pad, thus giving an indication that the device has gone through a freeze stage and back through a thaw stage.

Problems have arisen in giving an accurate indication of the passage of the device through the normal freezing point of water, i.e. 0° C., due to the undercooling effect of water which will permit water to remain in its liquid state substantially below its normal freezing point as for example, as low as $-16°$ C. This problem has been partially overcome by the addition of certain nucleating agents to the water. An example of this is shown in British Patent No. 1,245,135, issued to Scheller. Scheller discloses the technique of adding powdered glass to an ammonium chloride solution to avoid undercooling.

U.S. Pat. Nos. 3,956,153 and 3,980,581, issued respectively to Chadha and Godsey, disclose the use of nucleating agents having substantially similar space groups to thermal responsive materials used in disposable thermometers. Chadha '153, discloses the use of anthraquinone as a regenative nucleating agent.

It is known that over a period of time a nucleating agent will become "poisoned". Not wishing to be bound by theory this poisoning effect is believed to result either from contamination by the medium into which it is incorporated or by some as yet unexplained change with time in the crystal structure of the surface of the nucleating agent. The solution to this "poisoning" problem which Chadha proposed was to incorporate into the thermally responsive material a nucleating agent which is slightly soluble in the thermally responsive material at a concentration in excess of the solubility. The result is that with each remelt and nucleation cycle a fresh surface of nucleating agent is presented which effectively nucleates the thermally responsive medium. Of course where the preferred nucleating agent for a system is insoluble. The approach of Chada cannot be utilized.

An improved freeze indicator has been disclosed in U.S. Pat. No. 4,191,125 to Johnson. That '125 patent discloses a device comprising a water filled frangible ampule, a nucleating agent and a surfactant. Suitable nucleating agents which are disclosed include cupric sulfide, ferrous sulfide, zinc metal, molybdenum sulfide, tungsten sulfide, beryllium aluminum silicate and silver iodide, all of which are sunbstantially insoluble in water. These insoluble nucleating agents are susceptible to the poisoning effect discussed above.

SUMMARY OF THE INVENTION

In a freeze indicator which comprises a frangible ampule containing water and a nucleating agent which is an insoluble inorganic salt of a metal, it has been surprisingly found that the effectiveness of the nucleating agent can be maintained over an extended period of time by including in the water-nucleating agent mixture a poison inhibitor which is a water soluble salt whose cation is the same as that of the nucleating agent. For example where the nucleating agent is cupric sulfide, the poison inhibitor can be cupric sulfate. Where the nucleating agent is silver iodide the poison inhibitor can be silver fluoride. Where the nucleating agent is zinc metal the poison inhibitor can be any water soluble zinc compound, e.g., zinc chloride.

DETAILED DESCRIPTION OF THE INVENTION

This invention relates to a method of inhibiting the poisoning of a nucleating agent used in a water based freeze indicator, and the composition of the nucleating agent and poison inhibitor. The term "poison inhibitor" as used in the specification and claims is used as a matter of convenience and not intended to describe a mechanism by which the useful life of a nucleating agent is extended. In the practice of the invention disclosed in U.S. Pat. No. 4,191,125 to Johnson, it was found that while any nucleating agent within the scope of the invention would be effective immediately after the preparation of the ampules, with time, its effectiveness deteriorated as shown by breakage tests.

To test the effectiveness of a particular nucleating agent a batch of several hundred ampules designed to have a particular freezing point would be prepared, and divided into lots of fifty. A new lot would be frozen each day by holding at the particular temperature for which it was designed to break for about one hour. The number of ampules broken would be recorded. The tests would be repeated for at least seven days. An effective nucleating agent should result in the breakage of fifty out of ampules fifty in each test.

To aid in the understanding of the instant invention the disclosure of Johnson, U.S. Pat. No. 4,191,125 will be repeated herein in detail. The invention may be more fully appreciated by reference to the drawings.

Figure 1:
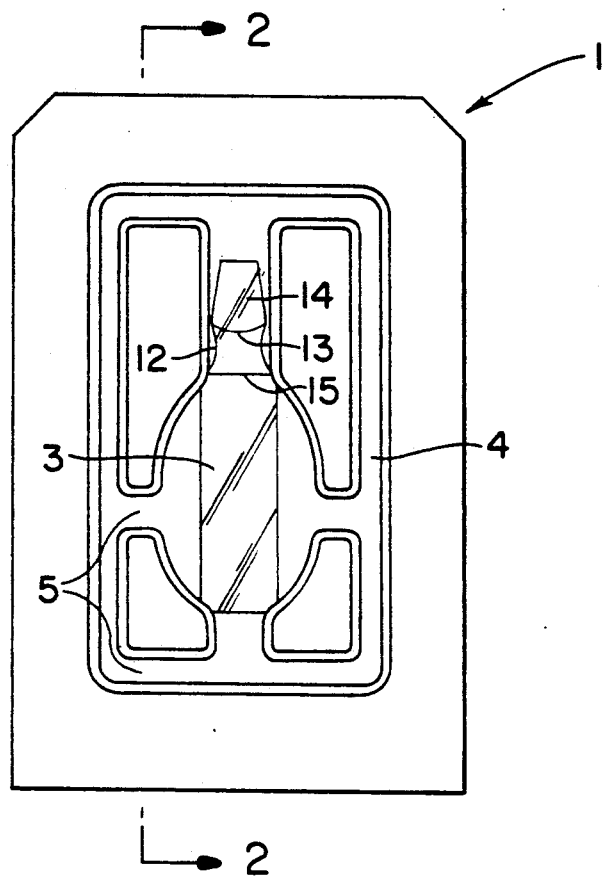
FIG. 1 is a top plan view of the indicator incorporating some of the features of the invention.

Referring now more particularly to FIG. 1 there is provided freeze indicator 1 which includes frangible housing 3 which may be made of glass, polystyrene or any frangible material, inert to the liquid, which can be filed with liquid and sealed.

Figure 2:
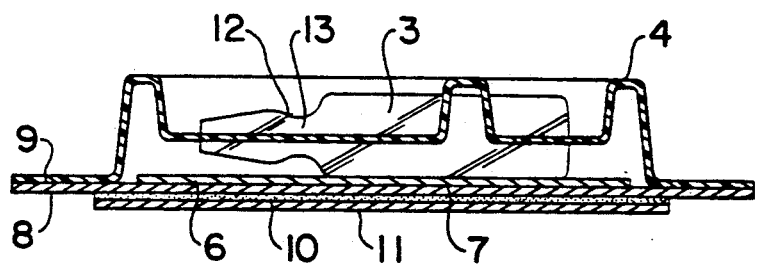
FIG. 2 is a cross-sectional side elevational view of the device shown in FIG. 1 taken along line 2—2.

Referring now to FIG. 2, frangible container 3 houses a liquid, such as water, which undergoes expansion upon freezing, thereby fracturing the frangible container when the environment around the indicator passes below the freezing point of water. In order to avoid the undercooling effects which depress the freezing point of water significantly, a nucleating agent is added to the water. The nucleating agent most preferred is one which has substantially the same molecular space grouping as the frozen water. This provides for faster and more complete crystal growth when the environment passes below the freezing point of water.

Examples of acceptable nucleating agents are cupric sulfide and beryllium aluminum silicate. Other acceptable materials are ferrous sulfide, zinc metal, molybdenum sulfide, and tungsten sulfide. Also, silver iodine has been shown to provide adequate results.

In order to increase the surface area of contact between nucleating agents and the water, a surfactant of wetting agent has also been added to the mixture. Suitable surfactants include Atlas G-2127, Tween 80, Ultrawet 601 and Triton X-100, all of which are commercially available. Tween 80, represented by the chemical expression polyoxyethylene 20 sorbitan monoleate. Triton X-100 is a para-isooctyl polyethylene glycol phenyl ether containing an average of ten ETO moieties per molecule.

In order to fine-tune the device so that an indication is given for a predetermined temperature, an amount of deuterium oxide may be added to the water. Deuterium oxide ($D_2O$) has a normal freeze point around 4° C. By adding the proper amount of $D_2O$ to $H_2O$, the freeze point of the mixture may be raised accordingly to accommodate particular needs. Even by using the above mentioned nucleating agents, it has been found that the device, without $D_2O$ added, freezes at about −4° C. By formulating a mixture of 98% $D_2O$ and 2% $H_2O$, the freeze point is raised to approximately 0° C. Various freeze points between 4° C. and 0° C. may be provided by adding lesser and lesser amount of $D_2O$ below 98%. Since frozen deuterium oxide has the same molecular space groupings as frozen water, the same nucleating agents as mentioned above may also be used to overcome the undercooling affect.

As can be seen in FIG. 2, the frangible ampule is protected from damage before freezing by a semi-rigid plastic blister 4. This blister 4 has various ridges 5 which provide mechanical strength to the device so that the ampule will not break if handled roughly. The blister can be vacuum formed of polyvinyl chloride, or any other suitable deformable plastic material which is inert to the liquid system of the indicator.

Immediately below the frangible ampule is indicator pad 6 which is a layer of absorbent material such as Whatman 1 MM paper, available from Whatman Company. A water soluble dye 7 is printed on the backside of indicator pad 6. When the ampule 3 is broken, an amount of unfrozen water is released from the ampule and poured onto pad 6, and is absorbed down to dye layer 7. The water will dissolve the dye, causing the dye to migrate to the top of the pad nearest the ampule. Since blister 4 is an optically clear material, a visible indication of freeze is then provided.

In most prior art freeze indicators, a thaw must occur in order to determine that the environment had ever undergone freeze due to the fact that upon freezing, the liquid, such as water, becomes solid and cannot possibly wet an indicator means.

It is uncertain as to why in Johnson's device, this wetting occurs immediately upon freezing and breakage of the ampule. However, it is possible that there is only sufficient solidification of a portion of the water to break the ampule, but enough liquid remaining present to give an immediate color change on the indicator paper. Also, as the water freezes and expands into ice, the pressure in the remaining part of the ampule increases, causing a depression of the freezing point of the remaining water. When the ampule breaks, there is a sudden decrease in pressure inside the ampule, causing the water to be quickly propelled onto the indicator pad before it can freeze. Also, the surfactant assists in the removal of the water from the cracked ampule by lowering the surface tension between the water and the fractured ampule, thus providing a dual function for the surfactant, the other function being to increase the surface area of contact between the liquid and the nucleating agent.

Referring again to FIG. 2, the blister cover 4 is sealed to backing 8 around edges 9 of the device by heat sealing. An adhesive 10 is provided on the bottom of backing 8 so that the freeze indicator may be readily attached to packages which need such an indicator. A paper cover 11, which is prelable from the adhesive, is applied over the adhesive 10 to protect the adhesive prior to use.

As can be seen from FIGS. 1 and 2, the ampule 3, which in the embodiment is glass, includes constructed neck 12. The constructed neck is at liquid fill height of the ampule when the ampule is upright. Air space is therefore provided above the restricted neck in region 13. The ampule is sealed with either an epoxy or a glass melt seal as indicated at 14. The air space of 13 provides for volumetric expansion of the liquid due to heating, such expansion being smaller than the volumetric expansion due to freezing. In this embodiment, approximately two percent (2%) air space is provided. The fill level of the ampule is indicated by line 15 shown in FIG. 1. The air space which is provided in region 13 should be within the limits of one to six percent (1%-6%) of the total volume of the ampule.

Figure 3:
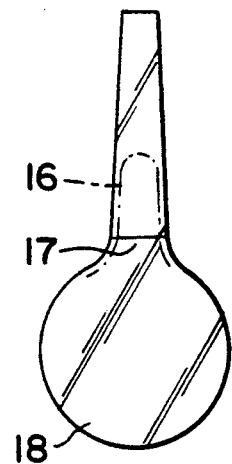
FIG. 3 is an alternative ampule which may be used in the indicator shown in FIG. 1.

Another embodiment of the ampule is shown in FIG. 3 in which a bulb-type container with capillary extension 16 is provided. The bulb is filled to a level 17 with the mixture of water, surfactant, and nucleating agent. A part of the nucleating agent, which in this embodiment can be cupric sulfide, is indicated at 18. The volume of the air space in the capillary portion of the ampule 16 is again within the range listed above. Thus the air space is small enough to permit breakage of the ampule due to the expansion of the freezing liquid, but large enough to allow thermal expansion of the liquid without breaking the ampule.

In the manufacture of the prior art freeze indicator device as disclosed by Johnson, a specification of 97% purity was set for the cupric sulfide. From time to time difficulty was experienced in the operation of the device in the operation of the freeze indicator due to excessive amounts of soluble contaminants in the cupric sulfide, resulting in depression of the freezing point of the indicator solution. As a consequence they fail to function at the design temperature. In order resolve this problem the specification for cupric sulfide was changed to 99+%. The product received had a purity of 99.7%, In using the high purity CuS a new problem developed. While initially all indicators tested broke at the test temperature, after aging two days, 20% of the indicators did not break. After four days only half the indicators tested broke, and after one week only ten percent broke.

If the manufacturer of the freeze indicator is the user and fresh indicators are used within one day of manufacture no problem is encountered. However, if the indicators are shipped to the end user, and are allowed to stand for a period of time faulty results may be experienced in that less than all of the indicators will break on use.

By a process of elimination it was concluded that the offending component of the indicator composition was the cupric sulfide. Washing of the cupric sulfide did not resolve the problem. The cupric sulfide was tested for cupric ion both in retains samples of CuS which were satisfactory and of samples which did not give acceptable ampule breakage. The test consisted of adding potassium iodide to a slurry of cupric sulfide. Surprisingly, the expected precipitate was found in the retain samples but not in the suspect lot of CuS.

Tests for cuprous ions on sample lots from other suppliers showed that CuS which did not properly nucleate the water to result in breakage of the ampules was free of cuprous ions. These samples were about 99.0 to 99.5% CuS. It was postulated that the cause of the problem was "poisoning" of the nucleating agent over time. This "poisoning" effect is a common problem in nucleating agents; see for example U.S. Pat. No. 3,956,153 (Chada) discussed above. From the quantity of precipitate resulting from the iodide test it was suggested that cuprous ion was not the only source of copper ion.

Surprisingly, the addition of cupric sulfate to the water system of the indicator was found to resolve the nucleation problem and resulted in successful vial breakage at test conditions. It has been found that at least 0.075 wt % cupric sulfate, based on the cupric sulfide, when added to the water system of the indicator results in protection of the cupric sulfide nucleating agent from poisoning. Preferably at least 0.09% cupric sulfate can be used; more preferably at least 0.10% cupric sulfate is used. Use of larger amounts of cupric sulfate, e.g., 0.2%, while effective to insure proper nucleation after aging, begins to have an effect on the freezing point of the indicator solution and must be taken into account when designing the freezing point of the device. The specification for cupric sulfide is 99+% pure CuS.

Not wishing to be bound by theory, it is believed that the mechanism which operates to protect the CuS from poisoning is the continual transfer of copper ions in and out of solution maintaining a dynamic equilibrium between the insoluble cupric sulfide and the soluble cupric sulfate. The result is a continual replenishing of the surface of the cupric sulfide with fresh copper ions.

To demonstrate the effectiveness of cupric sulfate as a poison inhibitor the following tests were preformed. A batch of identical ampules were prepared with the of cupric sulfate as the only variable. The ampules were tested in lots of 50 for specific time periods.

EXAMPLE I

A freeze solution having a freezing point at 0° C. was prepared having the following formulation:

| Component | Quantity |
| --- | --- |
| Deuterium Oxide | 1 liter |
| Synotol 119* | 2.6 grams |
| methylene blue dye | 0.38 grams |
| Cupric sulfide | 250 grams |

*An alkylolamide surfactant manufactured by PVO International, Inc.

Freeze indicators were prepared by placing the ampules in a well stirred tank containing the freeze solution, drawing a vacuum on the system to remove air from the ampules and releasing the vacuum, thereby filling the ampules. The filled ampules were then sealed. The ampules had a volume of 1 cc. The ampules were designed to break at 0° C. were tested at −3° C. An amount of cupric sulfate was added to the composition as shown in Table I.

The amount of cupric sulfate added to test ampules in groups of fifty vials each, was varied over a range of 0.0 to 0.2% by wt. based on the CuS. The results are shown in Table I.

TABLE I

| | BREAKAGE TEST −3° C. | | | |
| --- | --- | --- | --- | --- |
| Cupric Sulfate* (wt. %) | One Day | One Week | Two Weeks | Two Months |
| 0% | 50/50 | 41/50 | 5/50 | 1/50 |
| 0.05 | 48/50 | 38/50 | 10/50 | 3/50 |
| 0.1 | 50/50 | 50/50 | 48/50 | 50/50 |
| 0.2 | 15/50 | — | — | — |

*Based on the weight of cupric sulfide

The ampules containing 0.2% cupric sulfate did not pass the break test because this concentration of cupric sulfate depressed the melting point below 0° C.

EXAMPLE II

The experiments of Example I were repeated for ampules designed to break at −4° C. The following formulation was used in preparing the ampules:

| Component | Quantity |
| --- | --- |
| Distilled water | 1 liter |
| Synotol 119* | 12.6 grams |
| Safranin O dye | 1.88 grams |
| Cupric sulfide | 250 grams |

*An alkylolamide surfactant manufactured by manufactured by PVO International, Inc.

The test temperature was −7° C. the results are shown in Table II.

TABLE II

| | BREAKAGE TEST −7° C. | | | |
| --- | --- | --- | --- | --- |
| Cupric Sulfate* (wt. %) | One Day | One Week | Two Weeks | Two Months |
| 0% | 50/50 | 46/50 | 12/50 | 2/50 |
| 0.05 | 50/50 | 49/50 | 21/50 | 5/50 |
| 0.1 | 50/50 | 49/50 | 50/50 | 50/50 |
| 0.2 | 10/50 | — | — | — |

*Based on the weight of Cupric Sulfate

Not wishing to be bound by theory it is believed that at the 0.2% level of copper sulfate the freezing point of the solution has been depressed sufficiently to prevent breakage at the test temperature. While the ampules are not satisfactory for a −4° C. monitoring device they will work at a lower temperature. If desired excess cupric sulfate can be used to control the freezing point of the ampule. However, for the purpose of this invention at least 0.075 wt % cupric sulfate must be utilized, preferably at least 0.09%, most preferably at least 0.1 wt % based on the cupric sulfide.

The concept of this invention may be described generically as a nucleating agent system comprising a substantially insoluble nucleating agent in combination with a poison inhibitor. The nucleating agent system is defined by selecting a nucleating agent which is a metal compound insoluble in a liquid which expands upon freezing, the metal compound and liquid having substantially similar molecular space groupings, a metal salt, soluble in the liquid as the poison inhibitor, the metal salt being a salt of the same metal as the metal compound, thereby providing a source of soluble metal ion of the same metal as the cation of the inhibitor. The poison inhibitor must have a solubility in excess of the concentration at which it will be used, e.g., at least 0.15 grams per 100 ml of water at room temperature. Preferably, the solubility of the poison inhibitor is at least 0.3 grams per 100 ml; more preferably the solubility is at least 1 gram per 100 ml; most preferably at least 10 grams per 100 ml.

It is well known that cuprous iodide acts as a nucleating agent for water in ice formation. The phenomenon is used in artificial rain making and in producing "snow" for ski slopes where natural precipitation has not occurred. Based on this knowledge freeze indicators were prepared using cuprous iodide as the nucleating agent. Tests on freshly prepared indicators resulted in 100% breakage after 10 minutes at the test temperature. After one day of aging, however, only 60% of the test specimens broke after one hour, suggesting a poisoning effect was at work. The addition of 0.1% of cupric sulfate, based on the iodide, to indicator system resulted in improved nucleation.

Illustrative, non-limiting examples of poison inhibitors are shown in Table III. As used in the specification and claims, the term metal compound includes zinc metal.

TABLE III

| Nucleating Agent | Poison Inhibitor |
|---|---|
| Cupric Sulfide | Cupric sulfate |
| ferrous sulfide | ferrous sulfate |
| molybdenum sulfide | molybdenum tetrabromide |
| silver iodide | silver fluoride |
| zinc metal | zinc chloride |
| cuprous iodide | cupric sulfate, cuprous chloride |

The level of poison inhibitor, based on the nucleating agent, is the same as that disclosed for the cupric sulfide/cupric sulfate system. Expressed in weight percent based of the weight of nucleating agent the amount of poison inhibitor used is at least 0.075%, more preferably at least 0.09%, most preferably at least 0.1%. The poison inhibitor must have a solubility in excess of the concentration at which it will be used, e.g., at least 0.15 grams per 100 ml of water at room temperature. Preferably, the solubility of the poison inhibitor is at least 0.3 grams per 100 ml; more preferably the solubility is at least 1 gram per 100 ml; most preferably at least 10 grams per 100 ml.

Those skilled in the art having access to this disclosure will appreciate that by selecting a metal compound which has finite solubility in the order of about 0.15 wt. % to about 1.0 wt % based on the weight of the liquid, the inhibitor and poison inhibitor will be the identical compound. Preferably, the solubility of the compound will be about 0.15 to about 0.5 wt. %, more preferably about 0.15 to 0.3 wt. %, e.g., 0.25 wt. %. The upper limit of solubility is based on the practicality of controlling the freezing point of the solution. Large solubility levels will make it impossible to have both insoluble inhibitor present and a minor amount of soluble ion, while still being able to control the freezing point of the solution.

In the preferred embodiment of the invention the nucleating agent system comprises an in soluble metal compound in combination with a soluble salt of the metal wherein the valence of the metal in the metal salt is the same as the valence of the metal of metal compound. By way of illustration, where the metal compound is cupric sulfide the preferred salt is a soluble cupric salt such as cupric sulfate; where the metal compound is cuprous iodide the preferred metal salt is a soluble cuprous salt such as cuprous chloride.

Figure 4:
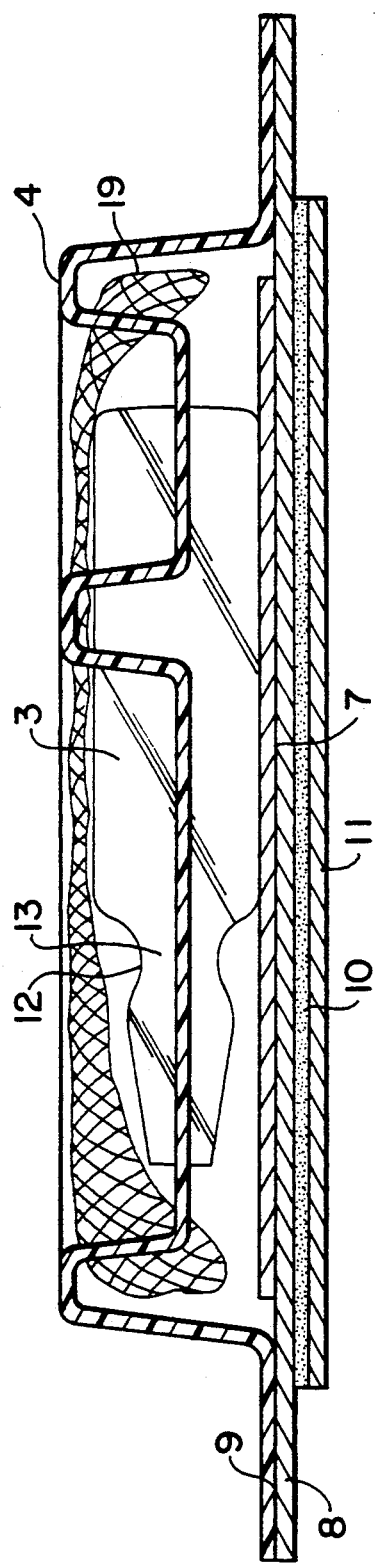
FIG. 4 is an alternative structure showing an absorbent indicator means.

In one embodiment of the invention as shown in FIG. 4, the indicator pad 6 of FIG. 2 is replaced by a swatch cotton cloth 19 which obscures the ampule from view, and a dye is incorporated into the liquid. When the liquid freezes, thereby breaking the ampule, the dye containing liquid is absorbed by the cotton swatch indicating that freezing has occurred. The swatch of cotton cloth incidentally serves to protect the ampule from shock breakage. The invention is described in terms of a swatch of cotton cloth. However, any material wetted by the liquid may be used, e.g., paper or other cellulosic fiberous material and liquid wettable synthetic materials. Illustrative, non-limiting examples of dyes useful in the practice of this invention are methylee blue and Safranin O.

While Johnson '125 discloses the use of a surfactant it has been found that the use of the surfactant is optional.

What is claimed is:

1. In a freeze indicator comprising a frangible ampule containing a liquid which expands upon freezing and a nucleating agent, said nucleating agent and said liquid having substantially similar space groupings, the improvement which comprises utilizing as a nucleating agent for the liquid a nucleating agent system comprising a metal compound insoluble in the liquid, said metal compound and said liquid having substantially similar molecular space groupings, in combination with a nucleating agent poison inhibitor comprising a salt of the same metal as the metal compound, said salt being soluble in said liquid.

2. The freeze indicator according to claim 1 wherein the metal compound is cupric sulfide, ferrous sulfide, molybdenum sulfide, beryllium aluminum silicate, tungsten sulfide, silver iodide or cuprous iodide.

3. The freeze indicator according to claim 1 wherein the metal salt is present at a concentration of about 0.075 wt. % to about 0.2 wt % based on the weight of metal compound.

4. The freeze indicator according to claim 1 wherein the metal salt is present at a concentration of about 0.09 wt. % to about 0.1 wt % based on the weight of metal compound.

5. The freeze indicator according to claim 1 wherein the metal compound and the soluble salt comprise metals of the same valence state.

6. The freeze indicator according to claim 1, wherein the liquid is water.

7. The freeze indicator according to claim 1, wherein the liquid is water, and the nucleating agent system comprises CuS in combination with cupric sulfate.

8. The freeze indicator according to claim 1, wherein the liquid is water, and the nucleating agent system comprises silver iodide in combination with silver fluoride.

9. The freeze indicator according to claim 1, wherein the liquid is water, and the nucleating agent system comprises CuI in combination with cuprous sulfate.

10. The freeze indicator according to claim 1, wherein the liquid is water, and the nucleating agent system comprises CuI in combination with cuprous chloride.

11. The freeze indicator according to claim 1 wherein a surfactant is included in the liquid.

12. The freeze indicator of claim 1 wherein a dye is incorporated into the liquid, and the ampule is obscured from view by an absorbent material.

13. The freeze indicator according to claim 12 wherein the absorbent material is cotton cloth.

14. The freeze indicator according to claim 1 wherein the liquid comprises deuterium oxide.

15. The freeze indicator according to claim 1 wherein the liquid comprises a mixture of deuterium oxide and a minor amount of water.

16. A method for substantially preventing undercooling in a liquid to be frozen which comprises incorporating into the liquid a nucleating agent system comprising a metal compound insoluble in the liquid, said metal compound and said liquid having substantially similar molecular space groupings, in combination with a nucleating agent poison inhibitor comprising a salt of the same metal as the metal compound, said salt being soluble in said liquid.

17. The method according to claim 16 wherein the metal compound is cupric sulfide, ferrous sulfide, molybdenum sulfide, beryllium aluminum silicate, tungsten sulfide, silver iodide or cuprous iodide.

18. The method according to claim 16 wherein the metal salt is present at a concentration of about 0.075 wt. % to about 0.2 wt % based on the weight of metal compound.

19. The method according to claim 16 wherein the metal salt is present at a concentration of about 0.09 wt. % to about 0.1 wt % based on the weight of metal compound.

20. The method according to claim 16 wherein the metal compound and the soluble salt comprise metals of the same valence state.

21. The method according to claim 16 wherein the liquid is water.

22. The method according to claim 16 wherein the liquid is water, and the nucleating agent system comprises CuS in combination with cupric sulfate.

23. The method according to claim 16 wherein the liquid is water, and the nucleating agent system comprises silver iodide in combination with silver chloride.

24. The method according to claim 16 wherein the liquid is water, and the nucleating agent system comprises CuI in combination with cuprous sulfate.

25. The method according to claim 16 wherein the liquid is water, and the nucleating agent system comprises CuI in combination with cuprous chloride.

26. The method according to claim 16 wherein a surfactant is included in the liquid.

27. The method according to claim 16 wherein a dye is incorporated into the liquid.

28. The method according to claim 27 wherein the dye is methylene blue or Safranin O.

29. The method according to claim 16 wherein the liquid comprises deuterium oxide.

30. The method according to claim 16 wherein the liquid comprises a mixture of deuterium oxide and a minor amount of water.

31. In a freeze indicator comprising a frangible ampule containing a liquid which expands upon freezing, a liquid responsive indicator means and a nucleating agent, said nucleating agent and said liquid having substantially similar molecular space groupings, the improvement which comprises utilizing as a nucleating agent for the liquid a metal compound having a solubility in the liquid of about 0.15 to about 1 wt % based on the metal compound.

32. The freeze indicator according to claim 31 wherein the solubility of the metal compound is about 0.15 to about 0.5 wt % based on the metal compound.

33. The freeze indicator according to claim 31 wherein a dye is incorporated into the liquid.

34. The freeze indicator according to claim 33 wherein the liquid responsive means is a material into which the liquid can be absorbed.

35. The freeze indicator according to claim 33 wherein the dye is methylene blue or Safranin O.

36. The freeze indicator according to claim 31 wherein a surfactant is incorporated into the liquid.

* * * * *